Iwasaki

[11] Patent Number: 4,472,737
[45] Date of Patent: Sep. 18, 1984

[54] STEREOGRAPHIC TOMOGRAM OBSERVING APPARATUS

[75] Inventor: Kenji Iwasaki, Utsunomiya, Japan

[73] Assignee: Tokyo Shibaura Denki Kabushiki Kaisha, Kawasaki, Japan

[21] Appl. No.: 413,444

[22] Filed: Aug. 31, 1982

[51] Int. Cl.³ .............................................. H04M 9/34
[52] U.S. Cl. ..................................... 358/88; 358/111; 358/237; 278/21; 278/41; 278/99
[58] Field of Search ........................ 358/88-89, 358/91, 92, 111, 236, 237; 378/21, 41, 99; 364/414

[56] References Cited

U.S. PATENT DOCUMENTS

| 3,493,290 | 1/1970 | Traub | 358/88 |
| 3,555,349 | 1/1971 | Munz | 358/88 |
| 4,079,417 | 3/1978 | Scudder | 358/111 |
| 4,214,267 | 7/1980 | Roese et al. | 358/89 |

OTHER PUBLICATIONS

Eric G. Rawson, "3-D Computer-Generated Movies Using a Varifocal Mirror", Applied Optics, Aug. 1968, vol. 7, No. 8.

Primary Examiner—Howard W. Britton
Assistant Examiner—Edward L. Coles
Attorney, Agent, or Firm—Cushman, Darby & Cushman

[57] ABSTRACT

A stereographic tomogram observing apparatus comprises a memory for storing tomographic picture data of a specific part of internal tissue of the object, a reading device for reading out the tomographic picture data, a projecting type CRT for projecting light beams at intensities corresponding to tomographic picture data read out by the reading device, a picture reproducing device made up of a plurality of tomographic picture reproducing screens arranged in parallel and for reproducing corresponding tomographic pictures, and a switching circuit for making the tomographic picture data read out correspond to the screen for reproducing the tomographic picture data.

10 Claims, 12 Drawing Figures

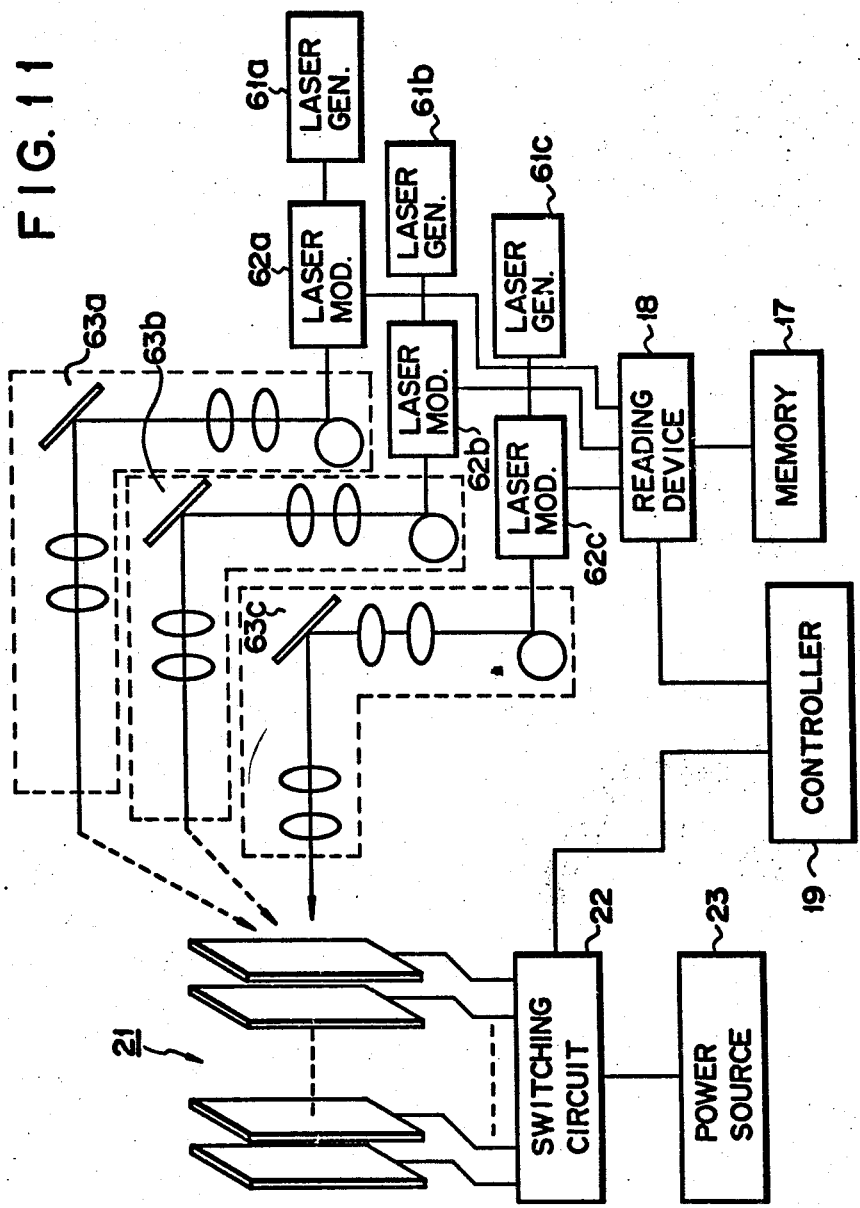

STEREOGRAPHIC TOMOGRAM OBSERVING APPARATUS

BACKGROUND OF THE INVENTION

The present invention relates to a stereographic tomogram observing apparatus.

In recent years, CT (computer tomography) equipment has remarkably improved and tomograms of the internal tissue of an object under diagnosis can easily be obtained. When this type of the diagnosis equipment is applied to tomographing the head of an object, it is common for the object to be tomographed along a body axis at a plurality of positions. The tomograms are displayed one by one on a CRT screen or recorded on film. A doctor carefully observes the tomograms to diagnose the specific part of the internal tissue.

If the tomograms are stereographed, the diagnosis can be more accurately and easily done.

When diagnosing by observing individual photographs on film or tomographs sequentially displayed on the CRT screen, it is difficult to see the internal tissue of the head stereographically. When tomographing a tumor in the head at several positions, the state of the tumor at each cross section can be observed, but the tumor as a whole is difficult to see. For observing the tumor stereographically, a doctor individually observes the tomograms and imaginarily combines them into a single and stereographic image. Alternatively, the doctor observes tomographs taken at different angular positions spaced at proper angular intervals and synthetically imagines a single stereographic configuration of the tumor on the basis of these individual pictures.

This method of determining the configuration of internal tissue requires high skill and is not conductive to correct and accurate observation.

SUMMARY OF THE INVENTION

Accordingly, an object of the present invention is to provide a stereographic tomogram observing in a simple manner apparatus with a simple construction.

According to the present invention, there is provided a stereographic tomogram observing apparatus comprising: memory means for storing tomographic picture data of cross sections of the object arranged in parallel at given intervals; means for reading out the tomographic picture data in a given sequence and at given time intervals; projecting means for converting tomographic picture data read out by the reading means into a light signal at an intensity according to the tomographic picture image; picture reproducing means made up of a plurality of tomographic picture reproducing units arranged in parallel for reproducing tomographic pictures according to the light signals projected from the projecting means; and selecting means for selecting the individual tomographic picture reproducing units in the picture reproducing means according to the tomographic picture data read out by the reading means.

BRIEF DESCRIPTION OF THE DRAWINGS

FIGS. 9 to 11 show other embodiments of a stereographing apparatus according to the present invention.

DETAILED DESCRIPTION OF THE PREFERRED EMBODIMENTS

An outline of an apparatus according to the present invention will be described referring to FIGS. 1 and 2.

Figure 1:
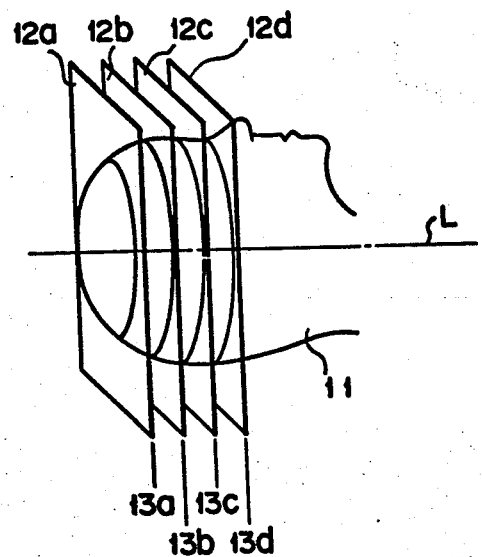
FIG. 1 schematically illustrates a head of an object under diagnosis, and positions of some cross sections and their tomograms of the head.
Figure 2:
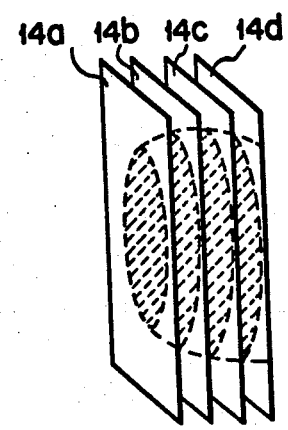
FIG. 2 schematically illustrates a picture reproducing device for reproducing a stereographic picture from tomograms.

In FIG. 1, reference numeral 11 designates the head of a living body under diagnosis. Numerals 12a to 12d designate tomograms of cross sections of the head 11 orthogonal to a body axis L at individual positions spaced at given intervals along the body axis. The stereographing apparatus according to the present invention provides a stereographic image of an effected part such as the tumorous part of the tissue on the basis of a plurality of tomograms of those cross sections. To this end, in the present invention, as shown in FIG. 2, screens 14a to 14d the tomogram reproducing means, aligned in line and in parallel with one another, are located at positions corresponding to the positions 13a to 13d of the individual tomograms 12a to 12d. The screen assembly thus arranged successively reproduces tomograms 12a to 12d at the positions of the cross sections 13a to 13d at the individual screens 14a to 14d. In this case, an observer 15, observes the tomograms 12a to 12d, successively reproduced as viewed from the front side of the arrangement of the picture reproducing means 14a to 14d, stereographically recognizing the affected part because of the afterimage effect of his eyes. The reproducing period of time is preferably 1/15 N sec. (N: the number of tomograms to be reproduced).

In order to improve the accuracy of the stereographic image, a ratio of the intervals between the adjacent cross sections for providing the tomograms 12a to 12d to the interval between the adjacent image reproducing means 14a to 14d is set to be equal to a ratio of a size of the tomogram taken to a size of the tomogram reproduced by the reproducing means.

In order to obtain a stereographic image with little distortion, the interval between the adjacent cross sections 13a to 13d is shortened or the density of the tomograms is increased, and further the interval between the adjacent image reproducing means 14a to 14d is likewise shortened.

The stereographing apparatus of the present invention will be described in detail.

Figure 3:
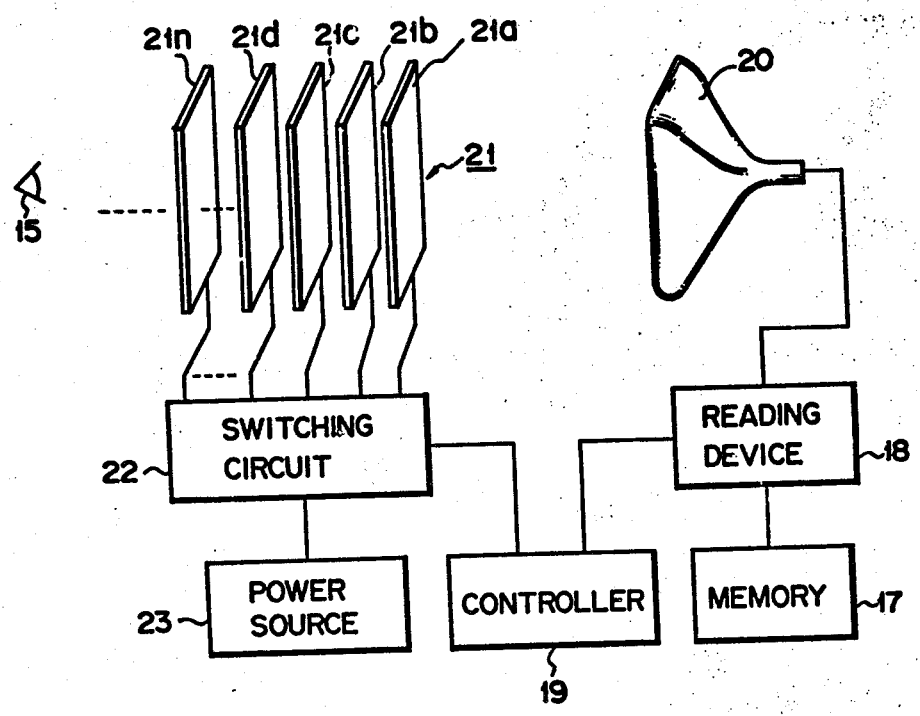
FIG. 3 shows an embodiment of a stereographic tomogram observing apparatus according to the present invention.

In FIG. 3, reference numeral 17 designates a memory for storing data of the tomograms 12a to 12d (FIG. 1) of the cross sections (13a to 13d) of the affected part. The memory 17 is connected to a reading device 18 such as a random access memory (RAM). The reading device 18 reads out the data on the tomograms 12a to 12d stored in the memory 17 in a given sequential order and at given time intervals. The reading device 18 is connected to a projection type CRT 20. The tomogram data read out by the device 18 is applied to the CRT 20 which in turn projects light beams with intensities modulated by the picture or tomogram data. The assembly of the screens 21a to 21d as the picture reproducing device 21 is arranged on a line extending in the projecting direction of the beams from the CRT 20. The beams projected from the CRT 20 impinge upon the screens 21a to 21d. As described above, the screens 21a to 21d are located corresponding to the cross sections providing the tomograms 12a to 12d. The screens are coupled with a power source 23 through a switching circuit 22. A controller 19 produces control signals to the reading device 18 and the switching circuit 22 for controlling the timing of the operation.

Figure 4:
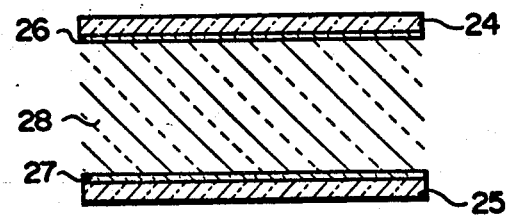
FIG. 4 shows a partial cross sectional view of a screen assembly in the stereographic apparatus shown in FIG. 3.
Figure 5A:
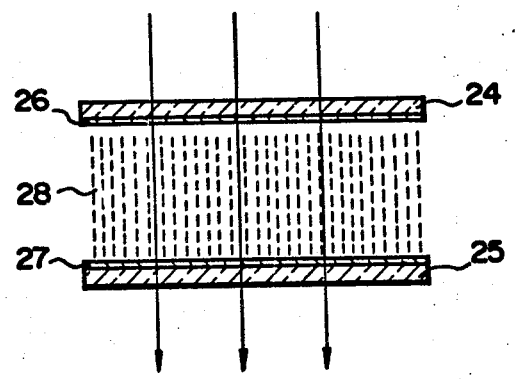
FIGS. 5A and 5B illustrate states of liquid crystal used in the screen shown in FIG. 4 when voltage is applied to the screen and when no voltage is applied to the same.
Figure 5B:
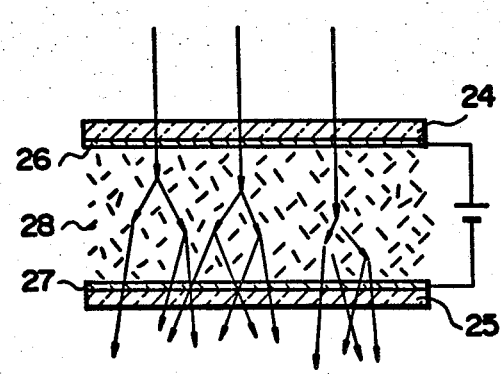

The screens 21a to 21d are each made of liquid crystal, for example, as shown in FIG. 4 and FIGS. 5A and 5B. As is known, the liquid crystal changes its state from transparent to opaque and vice versa under the voltage condition given by the switching circuit 22. As for the construction of the picture reproducing device, transparent electrodes 26 and 27 are formed on the surfaces of a couple of glass plates 24 and 25 arranged in parallel, facing each other, as shown in FIG. 4. A space between the glass plates 24 and 25 is filled up with Nematic liquid crystal 28. Although not shown, some measure is taken so that the liquid crystal is not spilled out of the space between the glass plates 24 and 25. With Nematic liquid crystal 28, when no voltage is applied between the transparent electrodes 26 and 27, molecules that are regularly lined up normal to the glass plates 24 and 25 become transparent to permit the light beam to be vertically incident on the glass plates 24 and 25. When voltage is applied between them, the orderly arrangement of molecules is disrupted to scatter incident light beams and to reflect the light beams. Since the Nematic liquid crystal becomes opaque enough to provide a visible figure when voltage is applied thereto, the liquid crystal serves as a sort of screen. A low bias voltage by which the liquid crystal 28 is not excited may be applied at the electrodes 26 and 27 to enhance the response time of the liquid crystal 28 when the drive voltage is applied at the electrodes 26 and 27. A high bias voltage by which the liquid crystal 28 is not deenergized may also be applied at the electrodes 26 and 27 to enhance the response time when supply of the drive voltage stops.

The picture reproducing device 21 in the FIG. 3 embodiment is assembled from a plurality of parallel arranged screens thus constructed.

The operation of the stereographing apparatus thus arranged will be described. Assume that data on the tomograms of the cross sections of the head, for example, are stored in the memory 17. The reading device 18 receives a read signal from the controller 19 to read out data on the tomogram at a given location from the memory 17, for example, the tomogram 12b at the location 13b, and inputs the data into the CRT 20. The controller 19 applies a control signal for controlling the operation of the switching circuit 22 to the circuit 22. Under control of the signal from the controller 19, the switching circuit 22 connects the power source 23 to the screen 21b, for example, corresponding to the picture data read out from the memory 17, that is, the screen at the location corresponding to the picture data read out from the memory 17. Then, the screen 21b is energized by the electrical power from the power source and becomes opaque. At this time, the remaining screens do not have electrical power applied and remain transparent. Under this condition, the light beam at intensity corresponding to the data on the picture 12b read out from the memory 17 is projected from the CRT tube 20. The light beams projected from the CRT 20 is projected from the right side in the drawing into the image reproducing device 21 through the screen assembly. The light beam applied to the image reproducing device passes through the transparent screen 21a which doesn't have voltage applied and are scattered in the opaque screen 21b which is supplied with voltage. In this way, the tomogram 12b at the cross section 13b is displayed on the screen 21b. In this way, the tomograms 12a to 12d are displayed on the corresponding screens 21a to 21d in a sequential manner. At this time, an observer observes the successively reproduced tomographic pictures displayed on the screens 21a to 21d of the screen assembly 21 from the front. In this case, the observer can recognize a stereographic image of the affected part on the basis of the plurality of the tomograms because of the eye's afterimage.

Figure 6:
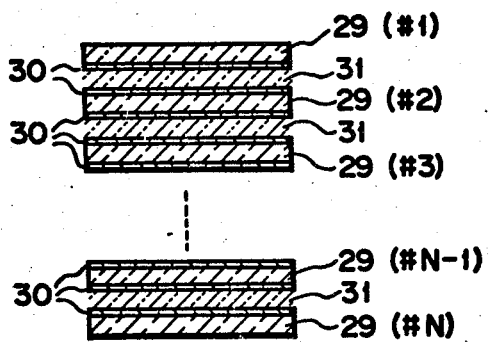
FIG. 6 shows a modification of a picture reproducing device used in the stereographying apparatus of FIG. 3.

In the arrangement of FIG. 3 in which a plurality of screens using liquid crystals as shown in FIG. 4 are arranged in parallel, a stereographic picture with little distortion can be obtained by narrowing the interval between the adjacent liquid layers. The structural arrangement of the liquid crystal screens for realizing such diminished distortion is illustrated in FIG. 6. As shown, a plurality of glass plates 29 are arranged in parallel and transparent electrodes 30 are fitted on both sides of all the glass plates 29 except for the outer surfaces of outermost glass plates #1 and #N. Nematic liquid crystal fills a space between the adjacent glass plates 29. Although not shown, as in the case of FIG. 4, liquid crystal is sealed in the spaces with material fitted around the fringes of the liquid crystal containing spaces. In the picture reproducing device thus constructed in FIG. 6, the glass plates, except for the outermost glass plates 29 #1 and #N, are commonly used for their adjacent liquid crystal screens, unlike the screen assembly shown in FIG. 4. Therefore, the liquid crystal layers present between the adjacent glass plates can be closer by a single glass plate for each liquid crystal screen. Thus, a slightly distorted stereographic picture can be formed. Further, since the number of necessary glass plates is reduced, the light amount absorbed by the glass plates 29 is reduced. Additionally, the light absorption in the space between the adjacent glass plates each between the adjacent liquid crystal plates can be eliminated, so that the stereographic picture is made clearer.

The Nematic liquid crystal as the light scattering means for the screens shown in FIG. 4 may be substituted by Cholesteric liquid crystal, Smetic liquid crystal or transparent ceramics with an electro-chemical effect such as PLZT.

A second embodiment of the present embodiment will be described referring to FIG. 7.

In the present embodiment, the picture reproducing device 21 is comprised of screens 21a to 21n provided on transparent discs 36a to 36n arranged in parallel along a rotating shaft 35. The screens in the present embodiment are of the same liquid crystal type as that of those in FIG. 4 or 6. The screens 21a to 21n are provided at different angular positions about the rotating shaft 35. The rotating discs 36a to 36n are fixed to the rotating shaft 35, so that all of them simultaneously rotate with the rotation of the shaft 35, while keeping their fixed relative angular positions. Like reference numerals are used for designating like portions in the previous embodiment. In the present embodiment, the switching circuit 22 is comprised of a stepping motor 37 coupled with the rotating shaft 35 and a drive circuit 38 for the stepping motor 37. The controller 19 sends control signals to the reading device 18 and the drive circuit 38 for controlling their operations. Also in the present embodiment, the picture data is read out from the memory 17 by the reading device 18 under control of the controller 19 and is applied to the projection type CRT 20. The CRT 20 projects light beams whose intensity is modulated by the picture data received at the screens located at given observation positions. Under control of the controller 19, the stepping motor 37 is rotated one step each time that one picture data is read out to successively rotate the screens receiving the light beam to the given position for observation.

The observer observes the picture reproducing device 21 from the front, or in the direction opposite to the light beam direction. In this way, he can observe the successively appearing tomograms at the observing position as a stereographic image of the affected part under diagnosis because of the afterimage effect of his eyes.

Figure 7:
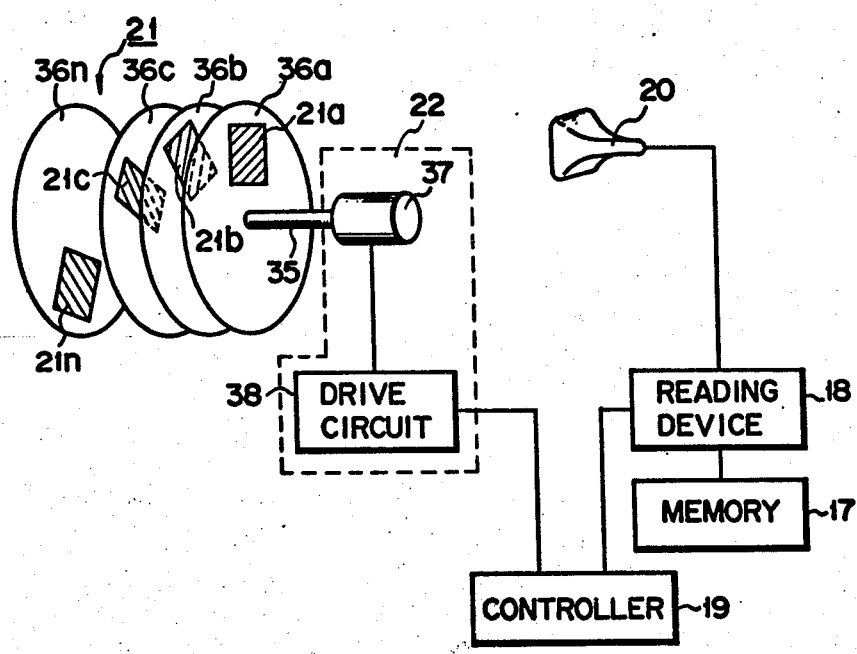
FIG. 7 shows another embodiment of a stereographing apparatus according to the present invention.
Figure 8:
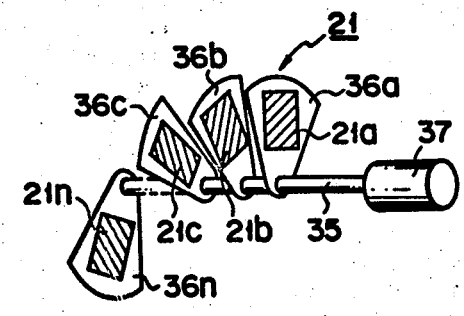
FIG. 8 shows a modification of a picture reproducing device used in the embodiment of FIG. 7.

FIG. 8 shows a modification of the picture reproducing device 21 in the embodiment shown in FIG. 7. In the present embodiment, transparent plates 36a to 36n are shaped like a sector, not like a disc as in the FIG. 7 embodiment. The sectors 36a to 36d are fixed to the rotating shaft 35 at different angular positions. Screens 21a to 21n are attached to the sector plates 35a to 36b, respectively, as shown. Accordingly, the screens 21a to 21n are also angularly displaced corresponding to the sector plates 36a to 36n, respectively. With such an arrangement, by rotating the shaft 35 step by step in synchronism with the read out of the picture data, the individual picture data successively read out can be reproduced on the screens in the form of tomograms. Accordingly, the observer can observe successively appearing tomograms at a fixed observing location and imaginarily synthesize them into a single stereographic image of the affected part of the object under diagnosis.

Figure 9:
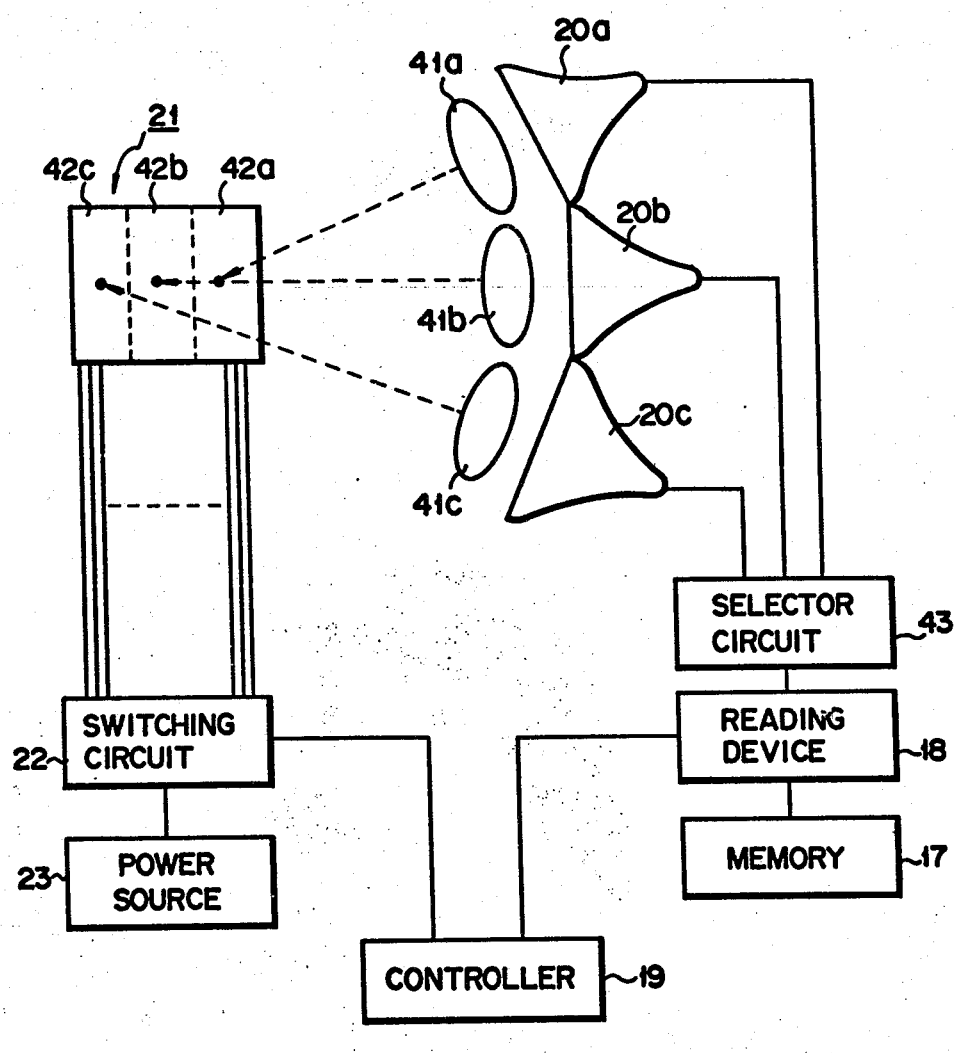

FIG. 9 shows another embodiment of the present invention in which three projection type CRTs 20a to 20c are employed. Corresponding to these three CRTs, the picture reproducing device 21 is divided into three sections 42a to 42c. The screens as shown in FIG. 4 or 6 are used for the reproducing sections 42a to 42c. Condensor lenses 41a to 41c are provided in front of the CRTs 20a to 20c so that the light beams from the CRTs 20a to 20c are focused at the centered screens of the reproducing sections 42a to 42c, respectively. The present embodiment further uses a selection circuit 43 for selecting the CRTs 20a to 20c, which is coupled with the output of the reading device 18. The selection circuit 43 is controlled by the controller 19.

The present embodiments feature is that in reproducing a tomogram on a given screen, the CRT having the best focus at the given screen is selected by the selection circuit 43. Accordingly, the tomogram appearing on the screen is clear and thus the stereographic image is clearer than that reproduced using a single CRT as in the previous embodiment.

Figure 10:
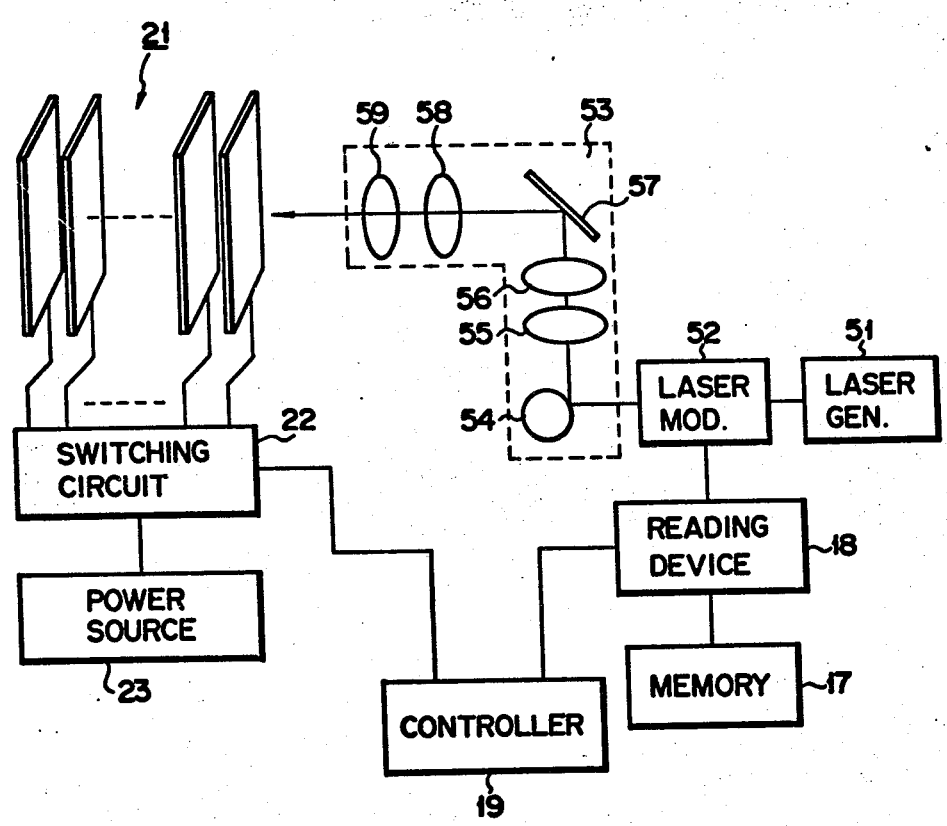

FIG. 10 shows yet another embodiment of the present embodiment. In this embodiment, a structural arrangement of the beam projecting means is different from that of the above-mentioned embodiment. As shown, the beam projecting means is comprised of a laser generator 51 for producing a laser beam, a light modulator 52 for intensity-modulating the laser beam from a laser generator 51 by the picture data from the memory 17 by the reading device 18, and a deflecting device 53 for deflecting the light beam from the light modulator 52. The picture data read out from the reading device 18 is inputted to the light modulator 52. The light modulator 52 receives the laser beam from the generator 51 and intensity-modulates the laser beam according to the picture data. The modulated beam is inputted to the light deflector 53. In the deflector 53, the light beam is inputted to a horizontal scanning rotating mirror 54 where it is deflected horizontally. The horizontally deflected beam is applied through relay lenses 55 and 56 to a vertical scanning plain mirror 57 wherein it is deflected vertically. The vertically deflected beam is projected through relay lenses 58 and 59 to the picture reproducing device 21. In this way, a picture is displayed by the reproducing device 21. Other operations of the present embodiment is substantially the same as in the previous embodiments. For example, the picture data read out and the screen for providing the reproduced picture are correspondingly controlled by the controller 19. The observer likewise observes the successively appearing tomograms reproduced to recognize a stereographic picture of the affected part.

In the above-mentioned embodiments, the stereographic picture is monochromatically displayed, but it may be displayed in color.

FIG. 11 shows a further embodiment of the present embodiment which can provide a color stereographic picture. To this end, three projecting means for projecting red, blue and green beams are provided in this embodiment. The red beamd projecting means is comprised of a red laser generator 61a, a light modulator 62a for intensity modulating the red color laser beam by the tomogram picture data from the reading device 18, and a deflector 63a for deflecting the modulated light beam from the light modulator 62a. The blue laser beam projecting means is comprised of a blue laser generator 61b, a light modulator 62b for indensity modulating the laser beam from the laser generator 61b by the tomogram data from the reading device 18, and a deflector 63b for directing the modulated light beam from the light modulator 62 to the picture reproducing device. The green laser beam projecting means is comprised of a green laser generator 61c, a light modulator 62c for intensity modulating the green laser beam from the laser generator on the basis of the tomogram data from the reading device 18, and a deflector 63c for directing the modulated light beam from the light modulator 62c. The construction of the deflectors 63a to 63c are substantially the same as that of the deflector 53. The laser beams from the three modulators 63a to 63c are focused at a point on the screen of the picture reproducing device 21 to reproduce a color tomogram. In the present embodiment for reproducing the tomograms in color, the picture data stored in the memory 17 contains color data relating to red, blue and green. The color data are read out by the reading device 18 and applied to the light modulators 62a to 62c. The light modulators 62a to 62c intensity modulates the laser beams from the laser generators 61a to 61c according to the inputted picture data. The modulated laser beams are focused at a point on the screen by the light deflectors 63a to 63c, thereby forming a color tomogram on the screen. Also in the present embodiment, the tomogram data and its related screen are correspondingly controlled by the controller 19. Thus, the observer can observe the tomograms on the screens to recognize a stereographic picture of the affected part of the internal tissue of the object under diagnosis. When the laser beam is used as in the FIG. 10 or 11 embodiment, the tomograms reproduced are clear and less distorted because of its low dispersion characteristic.

As described above, the stereographing apparatus of the present invention can directly use the tomogram data of the internal tissue taken by the CT scanner, for example, for the data for providing a stereographic image. Accordingly, a stereographic image can easily be obtained. Further, accurate correspondence of the positions of the tomograms taken with the positions of the screens for providing the reproduced images lessens distortion of the reproduced tomograms.

If a read out speed of the picture data from the memory is properly selected, the pictures can be reproduced one by one each with long time width. If so done, the observer can observe pictures in succession or a specific picture can continuously be displayed, allowing an observer to carefully observe the specific picture or tomogram.

What is claimed is:

1. A stereographic tomogram observing apparatus comprising:
    memory means for storing tomographic picture data of cross sections of said object arranged in parallel at given intervals;
    means for reading out said tomographic picture data in a given sequence and at given time intervals;
    projecting means for converting tomographic picture data read out by said reading means into a light signal at an intensity according to said tomographic picture image;
    picture reproducing means made up of a plurality of tomographic picture reproducing units arranged in parallel for reproducing tomographic pictures according to the light signals projected from said projecting means; and
    selecting means for selecting said individual tomographic picture reproducing units in said picture reproducing means according to said tomographic picture data read out by said reading means.

2. A stereographic tomogram observing apparatus according to claim 1, wherein said tomographic picture reproducing units include a couple of transparent plate members disposed in parallel, transparent electrodes formed on the surfaces of said transparent plate members which face each other, and light scattering means filling a space between said transparent electrodes.

3. A stereographic tomogram observing apparatus according to claim 1, wherein said picture reproducing means includes a plurality of transparent members arranged in parallel, transparent electrodes provided only on the inner surface of said transparent plate members on both the outermost sides of the plurality of said transparent plate members and attached to both sides of said remaining transparent plate members, and light scattering means filling a space between said adjacent and opposite transparent electrodes.

4. A stereographic tomogram observing apparatus according to claim 1, wherein said picture reproducing means includes a plurality of rotating transparent discs mounted in parallel to and along a rotating shaft, and picture reproducing units provided on said rotating discs and displaced at given angles about said rotating shaft.

5. A stereographic tomogram observing apparatus according to claim 1, wherein a plurality of said projecting means are provided, focal distances of said projecting means are made different by means of lenses, and said focal distances are made to correspond to different picture reproducing units of said picture reproducing means.

6. A stereographic tomogram observing apparatus according to claim 1, wherein said projecting means includes at least one laser generating means, modulating means for modulating the laser beam from said laser generating means by the tomographic picture data read out by said reading means, and deflecting means for scanning the output laser beam from said modulating means to project it said picture reproducing means.

7. A stereographic tomogram observing apparatus according to claim 2 or 3, wherein said light scattering means is Nematic liquid crystal.

8. A stereographic tomogram observing apparatus according to claim 3, wherein said light scattering means is Cholesteric liquid crystal.

9. A stereographic tomogram observing apparatus according to claim 2 or 3, wherein said light scattering means is Smetic liquid crystal.

10. A stereographic tomogram observing apparatus according to claim 2 or 3, wherein said light scattering means in PLZT.

* * * * *